United States Patent
Sugimoto

(10) Patent No.: US 11,084,435 B2
(45) Date of Patent: Aug. 10, 2021

(54) CONTROL DEVICE AND CONTROL SYSTEM

(71) Applicant: YAZAKI CORPORATION, Tokyo (JP)

(72) Inventor: Terumitsu Sugimoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 646 days.

(21) Appl. No.: 16/064,864

(22) PCT Filed: Dec. 22, 2016

(86) PCT No.: PCT/JP2016/088435
§ 371 (c)(1),
(2) Date: Jun. 21, 2018

(87) PCT Pub. No.: WO2017/111053
PCT Pub. Date: Jun. 29, 2017

(65) Prior Publication Data
US 2019/0001904 A1 Jan. 3, 2019

(30) Foreign Application Priority Data

Dec. 22, 2015 (JP) .............................. JP2015-250166

(51) Int. Cl.
*B60R 16/023* (2006.01)
*B60R 16/02* (2006.01)
(Continued)

(52) U.S. Cl.
CPC ........ *B60R 16/023* (2013.01); *B60R 16/0207* (2013.01); *G05B 19/0423* (2013.01);
(Continued)

(58) Field of Classification Search
None
See application file for complete search history.

(56) References Cited

U.S. PATENT DOCUMENTS

2015/0149682 A1* 5/2015 Uemura .................. G06F 13/28
710/308

FOREIGN PATENT DOCUMENTS

JP 8-55289 A 2/1996
JP 2007-261515 A 10/2007
(Continued)

OTHER PUBLICATIONS

International Search Report dated Mar. 7, 2017 issued by the International Searching Authority in counterpart International Patent Application No. PCT/JP2016/088435 (PCT/ISA/210).
(Continued)

*Primary Examiner* — Todd Melton
*Assistant Examiner* — Jason R Roberson
(74) *Attorney, Agent, or Firm* — Sughrue Mion, PLLC

(57) ABSTRACT

One or more of a plurality of input ports (P11-P14) that allow input of a binary signal are allocated to a unique port, and the potential thereof is fixed to a ground potential, etc., using the electrical wires (43d, 43c) of a wire harness. The potential of the remaining input ports in the initial state is set to a high potential using a pull-up circuit, etc., and a combination of the potential of the unique port and the potential of the remaining ports is associated with the ID value of the corresponding node. In order to share the remaining ports in the reading of the ID and the reading of a signal, the ID is established after a standby until a given time has elapsed without a change in the potential when the potential of the input ports is read.

6 Claims, 6 Drawing Sheets

(51) Int. Cl.
G05B 19/042 (2006.01)
H04L 12/28 (2006.01)
(52) U.S. Cl.
CPC .......... *H04L 12/28* (2013.01); *H04L 12/2832* (2013.01); *G05B 2219/2231* (2013.01)

(56) References Cited

FOREIGN PATENT DOCUMENTS

| | | |
|---|---|---|
| JP | 2010-195133 A | 9/2010 |
| JP | 2010-198510 A | 9/2010 |
| JP | 2012-1180 A | 1/2012 |
| JP | 2014-230097 A | 12/2014 |
| JP | 2015-33952 A | 2/2015 |

OTHER PUBLICATIONS

Written Opinion dated Mar. 7, 2017 issued by the International Searching Authority in counterpart International Patent Application No. PCT/JP2016/088435 (PCT/ISA/237).
Communication dated Dec. 19, 2017 issued by the Japanese Patent Office in counterpart Japanese Patent Application No. 2015-250166.

* cited by examiner

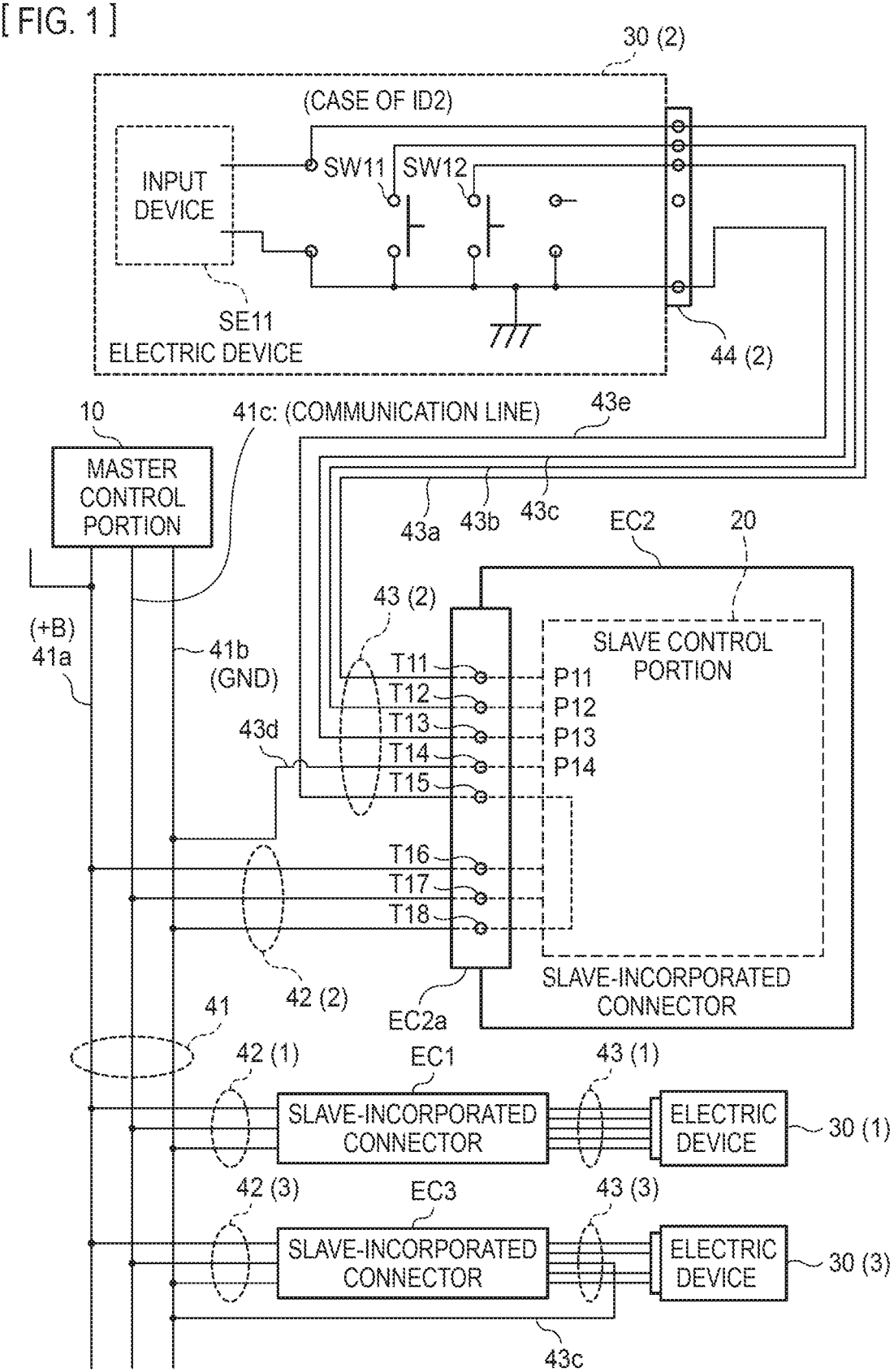
[FIG. 1]

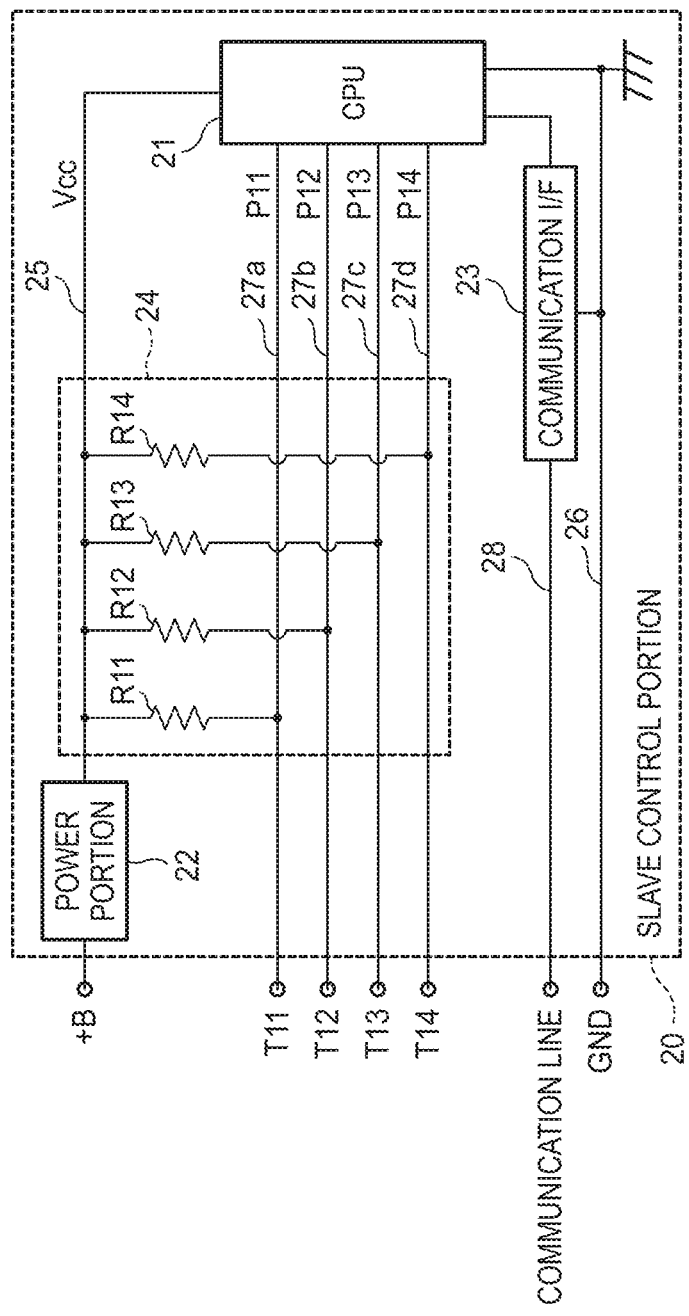
[FIG. 2]

[FIG. 3]
(a)
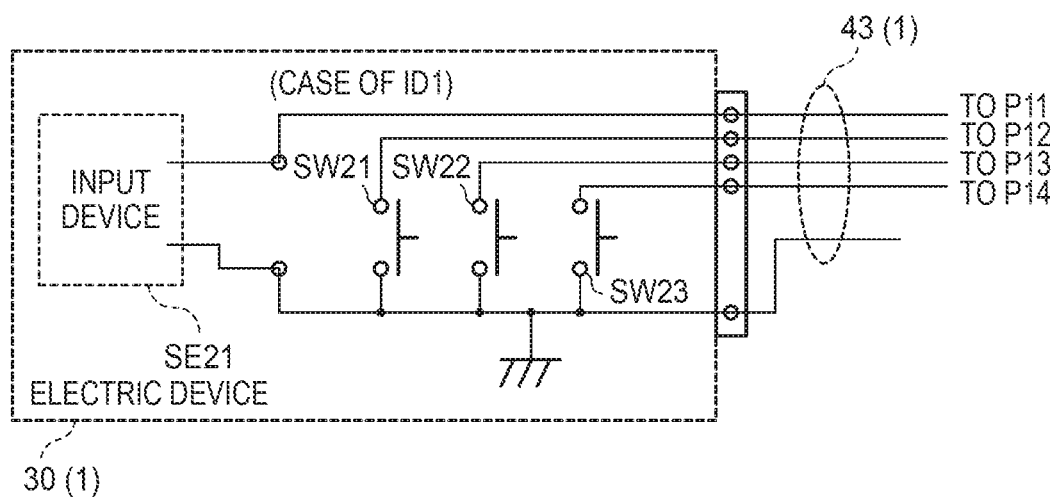
(b)
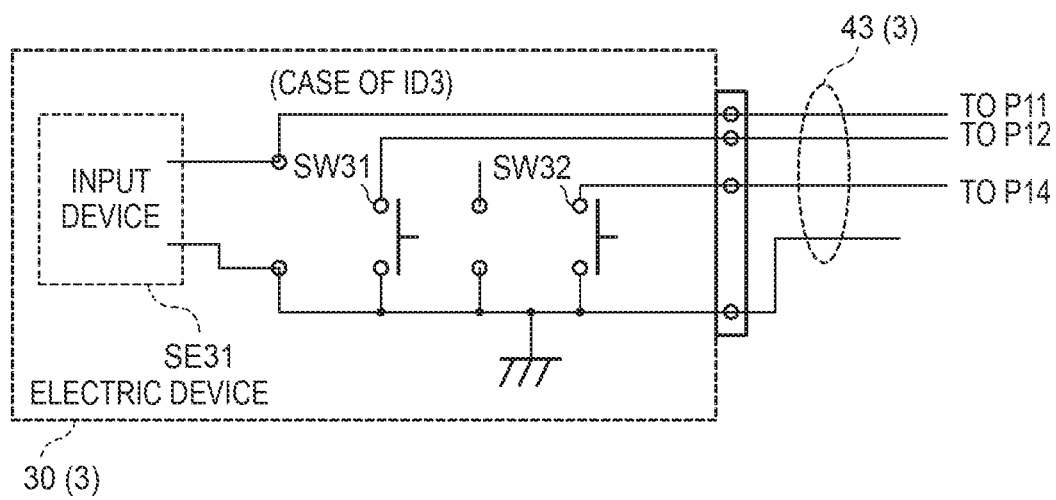

[FIG. 4]

| CONNECTION CONDITIONS | INPUT PORT | | | | REMARKS |
|---|---|---|---|---|---|
| | GENERAL-PURPOSE INPUT PORT | | | DEDICATED TO MOMENTARY SW Lo ONLY DURING OPERATION | |
| | P11 | P12 | P13 | P14 | NUMBER OF USABLE PORTS |
| ID1 | ○ | ○ | ○ | ○ | 4 |
| ID2 | ○ | ○ | ○ | GND | 3 |
| ID3 | ○ | GND | GND | ○ | 3 |
| ID4 | ○ | ○ | GND | GND | 3 |
| ID5 | ○ | GND | GND | ○ | 2 |
| ID6 | ○ | GND | GND | GND | 2 |
| ID7 | | GND | ○ | GND | 2 |

EXPLANATION OF SYMBOLS:
[○: INPUT PORT IS USABLE. GND: GROUNDED WHEN CONNECTED TO WIRE HARNESS.]

[FIG. 5]
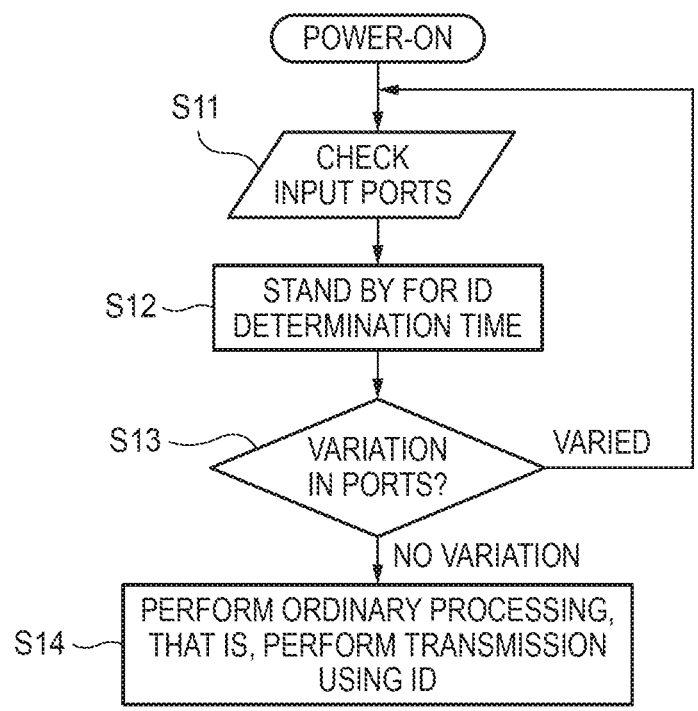

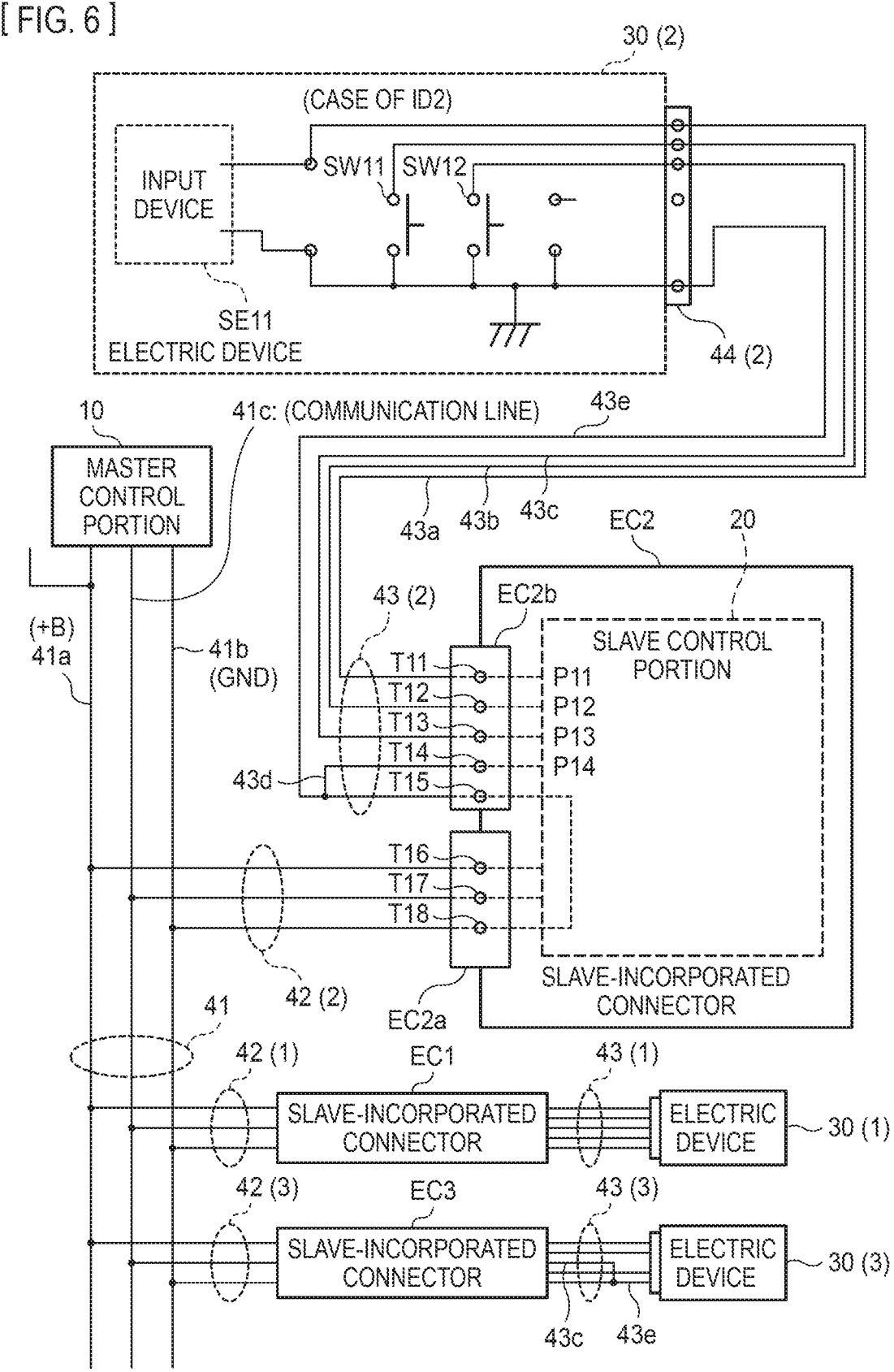
[FIG. 6]

CONTROL DEVICE AND CONTROL SYSTEM

TECHNICAL FIELD

The present invention relates to a control device and a control system that can be used for identifying each control unit in a control system having a plurality of control units connected to each other via a wire harness.

BACKGROUND ART

Various loads such as lamps, electric motors, and heaters and input elements such as switches and sensors are installed as electric devices in vehicles at various locations of a vehicle body in a distributed manner. Thus, in constructing a vehicular system using such loads and input elements, the length and weight of a wire harness can be reduced and power loss due to wiring can be decreased by disposing plural, independent electronic control units (ECUs) at different positions.

However, to control all the electric devices installed in a vehicle in a unified manner, it is necessary to connect the electronic control units to each other by communication lines and exchange instructions and data between them. Another type of configuration may be employed in which slave control units and one or more master control units are provided and the master control unit(s) manages the slave control units.

In control systems in which as described above electronic control units are connected to each other by a common communication line, in performing a data communication each electronic control unit needs to identify a connection source node and a connection destination node using unique identifiers (IDs). However, in a system installed in an actual vehicle, since the number of electronic control units and the number and types of electric devices may vary in various manners, it is necessary to study how to assign identifiers to electronic control units at respective nodes.

In a vehicular devices control system of Patent document 1, each slave device incorporates a resistor and determines an identifier by detecting a DC voltage appearing at the terminal of the resistor.

A control system of Patent document 2 is configured in such a manner that an electronic control unit (ECU) can assign node IDs to respective vehicle components connected to it. More specifically, provided are injectors corresponding to respective cylinders and each incorporating a pressure sensor and a communication driver and an ECU which is bus-connected to the communication drivers of the injectors via a common communication line. Sensor signals from the pressure sensors are input to the ECU via the sensor lines of the respective injectors. After outputting prescribed instructions to the communication line to assign node IDs to the respective injectors, the ECU performs processing of setting the voltages of the sensor lines of the respective injectors at the ground voltage for times corresponding to respective node IDs to be assigned. Upon receiving the instruction, each injector measures a time during which the voltage of its sensor line is kept at the ground voltage and determines a node ID on the basis of the measured time.

Patent document 3, which relates to a master-slave system, discloses a technique for facilitating determination of a node ID of a slave device as well as addition and failure detection of a slave device. More specifically, a master device and slave devices are common-bus-connected using a serial signal line and are thus connected to each other by a daisy chain. A response message to be communicated from a slave device contains flag information indicating a state of an upstream device and a connection state of a downstream device as well as a node ID setting state of other devices.

PRIOR ART DOCUMENTS

Patent Documents

Patent document 1: JP-A-2010-195133
Patent document 2: JP-A-2012-1180
Patent document 3: JP-A-2014-230097

SUMMARY OF THE INVENTION

Problems to be Solved by the Invention

However, in the case where as in Patent document 1 each slave device incorporates a special component such as a resistor corresponding to an identifier to be assigned, slave devices are made different from each other in type and type number, necessarily resulting in increase in their component costs and manufacturing costs.

Also, as disclosed in Patent document 2, the electronic control device assigns node IDs to subordinate vehicle components, the electronic control device cannot recognize the vehicle components in an initial state in which correct nodes have not been assigned yet. For example, this may cause a problem that contention occurs on the common communication line between signals that are sent from vehicle components. It is unavoidable that it takes long time until establishment of a state that the entire system operates correctly.

Also as disclosed in Patent document 3, a response message from a slave device contains flag information indicating a state of an upstream device and a connection state of a downstream device as well as a node ID setting state of other devices, since node IDs of the respective slave devices have not been determined yet in an initial state, a state that the entire system operates correctly cannot be established unless a complicated communication procedure is followed which consumes long time.

The case that as in Patent documents 2 and 3 a higher-rank control device determines a node ID of a lower-rank control device has a problem that the higher-rank control device cannot recognize types of respective electric devices connected to the output of the lower-rank control device. Thus, in an environment that as in vehicular systems various kinds of electric devices are connected to the output of each lower-rank control device, each lower-rank control device is obliged to perform a control on its own. As a result, the lower-rank control devices cannot be commonized in configuration and operation, necessarily causing increase in their component costs and manufacturing costs. Furthermore, in, for example, adding a new electric device to a system, the operation of each control device needs to be altered to a large extent, which would increase the development cost.

The present invention has been made in view of the above circumstances, and an object of the invention is therefore to provide a control device and a control system capable of commonizing, in configuration and operation, control units included in the system and controlling various kinds of electric devices.

Means for Solving the Problems

To attain the above object, the invention provides control devices and control systems having the following features (1) to (5):

(1) A control device which is used as one of plural control units that are connected to each other via a wire harness, the control device comprising:
- a control portion having a plurality of input ports which allow input of a binary signal respectively;
- a particular port potential determining portion which fixes, at a first reference potential, a potential of at least one particular port an assignment state of which can be changed one by one among the input ports;
- a remaining port potential determining portion which sets, in an initial state, a potential of each of remaining ports that are input ports other than the at least one particular port among the input ports at a second reference potential that is different from the first reference potential; and
- an ID determining portion which determines self identification information based on a combination of a potential of each of the at least one particular port and the potential of each of the remaining ports,
- wherein input elements are connected to the remaining ports respectively.

In the control device having the configuration of the above item (1), identification information (ID) of a node concerned is determined according to a combination of a particular port(s) and remaining ports of the input ports. Thus, even in a case that the plural control units are commonized in configuration and operation, difference pieces of identification information (IDs) can be assigned automatically to the respective control units. Further, since the potentials of the remaining ports can be changed, such input elements as switches can be connected to the remaining ports respectively. That is, the remaining ports can be used for both of determining identification information and receiving signals, which makes it possible to decrease the number of ports dedicated to determination of identification information (the above-mentioned particular port(s)) and thereby reduce the cost.

(2) The control device according to item (1), wherein the ID determining portion determines self identification information based on a combination of a potential of each of the at least one particular port and the potential of each of the remaining ports if no potential variation occurs when monitoring the potentials of the particular port and the remaining ports at least for a prescribed time at least in an initial state after power-on.

According to the control device having the configuration of the above item (2), even in a case that the potentials of the remaining ports may vary as in an environment that such input elements as switches are connected to the respective remaining ports, identification information (ID) of a node concerned can be determined correctly on the basis of potentials of the remaining ports.

(3) The control device according to item (1), wherein the particular port potential determining portion connects a ground line or a prescribed power line to the particular port electrically; and
wherein the remaining port potential determining portion connects the prescribed power line or the ground line to the remaining ports electrically via resistors, respectively.

According to the control device having the configuration of the above item (3), the particular port potential determining portion can fix the potential of each particular port at a high potential or a low potential. Furthermore, the remaining poor potential determining portion can fix the potential of each remaining port in an initial state at a low potential or a high potential.

(4) A control system comprising:
- a plurality of the control devices according to claim 1 as slave control units,
- wherein each of the slave control units and a master control unit which controls the slave control units are connected to each other via the wire harness so as to be able to communicate with each other.

According to the control system having the configuration of the above item (4), the master control unit can control various sets of electronic devices that are connected to the respective slave control units as subordinate devices, via the wire harness and the slave control units.

(5) The control system according to item (4), wherein the control portion of each of the slave control units transmits the identification information determined by the ID determining portion to at least the master control unit.

According to the control system having the configuration of the above item (5), since different pieces of identification information are assigned to the respective slave control units, the master control unit and each slave control unit can recognize a communication partner on the communication line of the common wire harness.

Advantages of the Invention

The control device and the control system according to the invention make it possible to commonize, in configuration and operation, plural control units included in the system. Furthermore, they make it possible to control various kinds of electric devices because a communication partner can be recognized using unique identification information even in a case that the plural control units are commonized in configuration and operation.

BRIEF DESCRIPTION OF THE DRAWINGS

FIG. 1 is a wiring diagram showing an example configuration of a control system that includes control devices according to an embodiment of the present invention.

FIG. 2 is a block diagram showing an example configuration of a slave control portion.

FIG. 3 is electric circuit diagrams showing example configurations of two sets of electric devices with which different IDs are assigned.

FIG. 4 is a schematic diagram showing a specific example of a corresponding relationship between sets of design specifications relating to use situations of plural input ports and IDs assigned to respective slave control portions.

FIG. 5 is a flowchart showing a processing procedure according to which each slave control unit recognizes its own ID.

FIG. 6 is a wiring diagram showing the configuration of a modification of the control system shown in FIG. 1.

MODES FOR CARRYING OUT THE INVENTION

A specific embodiment of the present invention will be hereinafter described with reference to the drawings.

FIG. 1 shows an example configuration of a control system that includes control devices according to the embodiment of the invention. The control system shown in FIG. 1 is configured assuming that it will be used for controlling various electric devices installed in a vehicle at various locations. It is assumed that control target electric devices are input elements such as switches and sensors and ones having a load such as electric motors, heaters, and lamps.

In the example shown in FIG. 1, three sets of electric devices 30(1), 30(2), and 30(3) are included in the control system as control targets. The three sets of electric devices 30(1), 30(2), and 30(3) are connected, as subordinate devices, to respective slave-incorporated connectors EC1, EC2, and EC3 each of which incorporates the electronic circuit of a slave control portion 20.

Each of the slave-incorporated connectors EC1, EC2, and EC3 is a connector housing having a connection unit for connecting collections of wires or a collection of wires and a device in a detachable manner, and has an inside space for housing of an electronic circuit board of the slave control portion 20. A connection unit EC2a is provided with a cavity in which many terminals (T11-T18) can be fixed.

One master control portion 10 is provided to control the entire system intensively. The master control portion 10 is electrically connected to the slave-incorporated connectors EC1, EC2, and EC3 by a wire harness.

The wire harness included in the control system shown in FIG. 1 includes a trunk line portion 41 and subharnesses 42(1), 42(2), 42(3), 43(1), 43(2), and 43(3). The trunk line portion 41 of the wire harness is basically a collection of three wires which are a power line 41a which is supplied with a prescribed DC power source voltage (+B), a ground (GND) line 41b, and a communication line 41c.

As shown in FIG. 1, the subharness 42(1) has three wires whose one ends are connected to the power line 41a, the ground line 41b, and the communication line 41c at halfway positions of the trunk line portion 41, respectively, and whose other ends are connected to physically and electrically to the connection unit EC2a of the slave-incorporated connector EC2 by means of respective terminals T16, T17, and T18.

Basically, the subharness 43(2) connects the slave-incorporated connector EC2 and electric devices 30(2). The subharness 43(2) is a collection of five wires 43a, 43b, 43c, 43d, and 43e, and terminals T11-T15 which are provided at one ends of the wires, respectively, are fixed to the connection unit EC2a. The four terminals T11, T12, T13, and T14 are connected to respective input ports P11, P12, P13, and P14 of the internal circuit of the slave control portion 20. The terminal T15 is electrically connected to the terminal T18 via the internal circuit of the slave control portion 20. Thus, the wire 43e which is connected to the terminal T15 of the subharness 43(2) is used as a ground line.

Among the five wires 43a, 43b, 43c, 43d, and 43e which constitute the subharness 43(2), the other ends of the four wires 43a, 43b, 43c, and 43e are connected to the electric devices 30(2) via a connector 44(2). The other end of the remaining wire 43d is connected to the ground line 41b of the trunk line portion 41. That is, the potential of the internal input port P14 of the slave-incorporated connector EC2 is always fixed at the ground potential by the ground line 41b. This is a special structure that is necessary for determining unique identification information that is used for identifying the slave-incorporated connector EC2.

The electric devices 30(2) shown in FIG. 1 are equipped with one input device SE11 and two switches SW11 and SW12. Any of various devices such as a sensor and a switch can be employed as the input device SE11, and there are no major restrictions on the potential of its output signal.

On the other hand, each of the switches SW11 and SW12 is a momentary-type switch whose electric contact is closed only while it is manipulated and is used for detecting a user input manipulation on a prescribed push switch, for example. The reason why the type of each of these switches is restricted to the momentary-type switch to use its output potential for determination of identification information. Details will be described later.

Equipped with the one input device SE11 and the two switches SW11 and SW12, the electric devices 30(2) shown in FIG. 1 can output three systems of electrical signals to the connector 44(2). On the other hand, the slave control portion 20 of the slave-incorporated connector EC2 is equipped with the four input ports P11, P12, P13, and P14. Since there are only three systems of input electrical signals, one input port is left free.

In view of the above, one, left free (i.e., not used for input of an electrical signal), of the four input ports P11, P12, P13, and P14 is used for determining identification information. In the example of FIG. 1, since the input port P14 of the slave-incorporated connector EC2 is left free, it is connected to the ground line 41b by the wire 43b and its potential is always kept at the ground potential. This potential is important in determining identification information.

Like the slave-incorporated connector EC2, each of the slave-incorporated connectors EC1 and EC3 shown in FIG. 1 incorporate a slave control portion 20. The slave control units 20 incorporated in the three respective slave-incorporated connectors EC1-EC3 all have a common configuration and control software. This enables cost reduction by commonization of components.

As shown in FIG. 1, the electric devices 30(1) are connected, as subordinate devices, to the slave-incorporated connector EC1 via the subharness 43(1) and the electric devices 30(3) are connected, as subordinate devices, to the slave-incorporated connector EC3 via the subharness 43(3).

One ends of all the five wires constituting the subharness 43(1) are connected to the slave-incorporated connector EC1, and their other ends are all connected to the respective electric devices 30(1). One ends of all the five wires constituting the subharness 43(3) are connected to the slave-incorporated connector EC3, and the other ends of the five wires excluding a wire 43c are connected to respective electric devices 30(3). The other end of the wire 43c is connected to the ground line 41b of the trunk line portion 41.

The electric devices 30(1) and 30(3) are configured as shown in FIG. 3. More specifically, the electric devices 30(1) have one input device SE21 and three switches SW21, SW22, SW23. The three switches SW21, SW22, SW23 are momentary-type switches and there are no special restrictions on the input device SE21.

Thus, the electric devices 30(1) output four systems of electrical signals. Four of the five wires constituting the subharness 43(1) are used for transmitting the four systems of electrical signals that are output from the electric devices 30(1), to the respective input ports P11, P12, P13, and P14 of the slave-incorporated connector EC1. The remaining one wire is used for determining a ground potential.

The electric devices 30(3) have one input device SE31 and two switches SW31 and SW32. The two switches SW31 and SW32 are momentary-type switches and there are no special restrictions on the input device SE31.

Thus, the electric devices 30(3) output three systems of electrical signals. Three of the five wires constituting the subharness 43(3) are used for transmitting the three systems of electrical signals that are output from the electric devices 30(3), to the respective input ports P11, P12, and P14 of the slave-incorporated connector EC3. The input port P13 of the slave-incorporated connector EC3 is connected to the ground line 41b by a wire 43c shown in FIG. 1, and its potential is always fixed at the ground potential. The remaining one wire of the subharness 43(3) is used for determining a ground potential.

<Example Configuration of Slave Control Portion 20>

FIG. 2 shows a specific example of the internal configuration of the slave control portion 20 shown in FIG. 1. As shown in FIG. 2, the slave control portion 20 is equipped with a microcomputer (CPU) 21, a power portion 22, a communication interface (I/F) 23, and a pull-up circuit 24.

The microcomputer 21 operates according to programs that are installed therein in advance and thereby realizes control functions that are required by the slave control portion 20. For example, where as with the electric devices 30(2) the control targets are the input device SE11 and the switches SW11 and SW12, the microcomputer 21 processes electrical signals that are output from these control targets and informs processing results to the master control portion 10. In the case of controlling an electric device that incorporates a load, the microcomputer 21 controls energization of the load according to an instruction etc. received from the master control portion 10. The microcomputer 21 also has a function of determining identification information (ID) that is assigned to the slave control portion 20 itself.

The microcomputer 21 shown in FIG. 2 is equipped with the four input ports P11, P12, P13, and P14 capable of processing a binary signal and a communication port. The input ports P11, P12, P13, and P14 are connected to the terminals T11, T12, T13, and T14 by signal lines 27*a*, 27*b*, 27*c*, and 27*d*, respectively.

The power portion 22 generates a stable DC voltage (Vcc: 5 V, for example) that is necessary for operation of the circuits such as the microcomputer 21, on the basis of the DC power source power (+B: 12 V, for example) that is supplied from the power line 41*a*.

The pull-up circuit 24 is equipped with four resistors R11, R12, R13, and R14. The signal lines 27*a*, 27*b*, 27*c*, and 27*d* are connected to the power line 25 via the four respective resistors R11, R12, R13, and R14. That is, in an initial state in which no external signals are received, the potentials of the signal lines 27*a*, 27*b*, 27*c*, and 27*d* are kept at a high potential (Vcc) by the pull-up circuit 24.

Where the input device SE11 of the control target electric devices 30(2) is of any of certain kinds, the slave control portion 20 may be modified in such a manner that the resistor R11 of the pull-up circuit 24 is eliminated or the input port P11 is replaced by an analog signal input port.

The communication interface 23 is a transceiver that performs signal processing for allowing the microcomputer 21 to perform a data communication using the communication line 41*c*. The communication interface 23 is connected to the communication line 41*c* of the trunk line portion 41 via the communication line 28 and the terminal T17.

<Necessity of Identification Information (ID)>

In the control system shown in FIG. 1, a data communication may be performed between the master control portion 10 and its plural subordinate slave control units 20 or between the plural slave control units 20 via the common communication line 41*c*. Thus, in performing a data communication, the master control portion 10 and each slave control portion 20 need to determine a transmission source and a transmission destination and, furthermore, to perform a control for preventing contention between plural signals on the common communication line 41*c*. Furthermore, since the different sets of electric devices 30 are connected to the plural slave control units 20 as subordinate devices, it is necessary for the master control portion 10 to control the plural slave control units 20 individually.

For the above purposes, it is necessary to assign unique pieces of identification information (IDs) to the plural respective slave control units 20 individually. However, in control systems in which, as in the control system shown in FIG. 1, all of the plural slave-incorporated connectors EC1-EC3 incorporate the slave control units 20 that are commonized in configuration and operation, it is impossible to assign difference pieces of identification information to the slave control units 20 in advance. Thus, in the control system shown in FIG. 1, the wire harness side is given a function of determining identification information.

<Specific Example of Relationship Between IDs and Plural Input Ports>

FIG. 4 shows a specific example of a corresponding relationship between sets of design specifications relating to use situations of the plural input ports P11-P14 and IDs assigned to respective slave control units 20.

The specification shown in FIG. 4 is set so as to enable discrimination between seven IDs, that is, ID1 to ID7, utilizing differences between signals appearing at the three (the input port P11 is excluded) of the four input ports P11-P14.

In FIG. 4, mark "o" indicates that the input port can be used for input of an electrical signal. However, whereas there are no major restrictions on the signal to be input to the input port P11, the signal to be input to each of the input ports P12-P14 is required to be a binary signal and to be in a prescribed potential state determined in advance (high potential: Hi) in an initial state or a steady state as in the case of the signal to be input to a momentary-type switch. In FIG. 4, symbol "GND" indicates that the potential of the input port is fixed at the ground potential or a low potential (Lo) equivalent to the ground potential when it is connected to the wire harness.

Thus, on the basis of the information shown in FIG. 4, the following seven kinds of identification information, that is, ID1 to ID7, can be assigned for combinations of potentials to appear at the three input ports P12, P13, and P14:

P12=Hi, P13=Hi, and P14=Hi: identification information ID1

P12=Hi, P13=Hi, and P14=Lo: identification information ID2

P12=Hi, P13=Lo, and P14=Hi: identification information ID3

P12=Lo, P13=Hi, and P14=Hi: identification information ID4

P12=Hi, P13=Lo, and P14=Lo: identification information ID5

P12=Lo, P13=Lo, and P14=Hi: identification information ID6

P12=Lo, P13=Hi, and P14=Lo: identification information ID7

In the specification shown in FIG. 4, for a slave control portion 20 that is assigned the identification information ID1, the potentials of none of the input ports P11-P14 are fixed. Thus, all of the four input ports P11-P14 can be used for input of an electrical signal, that is, the number of usable ports is equal to 4.

On the other hand, for a slave control portion 20 that is assigned the identification information ID2, the input port P14 is fixed at the ground potential (GND) and hence cannot be used for input of an electrical signal. Only the remaining three input ports P11, P12, and P13 can be used for input of an electrical signal, that is, the number of usable ports is equal to 3.

Likewise, for a slave control portion 20 that is assigned the identification information ID3, the number of usable ports is equal to 3. For a slave control portion 20 that is assigned the identification information ID4, the number of usable ports is equal to 3. For a slave control portion 20 that is assigned the identification information ID5, the number of usable ports is equal to 2. For a slave control portion 20 that is assigned the identification information ID6, the number of usable ports is equal to 2. For a slave control portion 20 that is assigned the identification information ID7, the number of usable ports is equal to 2.

<Explanation of Actual Configuration for Assigning of Identification Information>

In the control system shown in FIG. 1, the electric devices 30(2) which are connected to the slave-incorporated connector EC2 as subordinate devices output three electrical signals. Thus, to receive these three electrical signals, the slave control portion 20 of the slave-incorporated connector EC2 needs to use three input ports. That is, one of the four input ports P11-P14 is not used (left free). The non-used input port can be used for assigning of identification information.

In the configuration shown in FIG. 1, in the slave control portion 20 of the slave-incorporated connector EC2, the input port P14 receives no electrical signal from the electric devices 30(2), that is, it is left free. The input port P14 which is left free is connected to the ground line 41*b* via the wire 43*d*, whereby the potential of the input port P14 is fixed at the ground potential (Lo).

Since the high potential (Hi) is always applied to the input ports P11-P14 via the pull-up circuit shown in FIG. 2, the potentials of the input ports P11, P12, and P13 (the input port P14 is excluded whose potential is fixed at the ground potential (Lo)) are kept at the high potential (Hi) unless the input device SE11 or the switch SW11 or SW12 of the electric devices 30(2) operates.

That is, in a prescribed initial state or a steady state, the combination of the states of the input ports P11-P14 of the slave control portion 20 of the slave-incorporated connector EC2 satisfies the conditions of the "identification information ID2" in the specification shown in FIG. 4. Thus, by comparing a Hi/Lo combination of potentials of the respective input ports P11-P14 with the sets of conditions corresponding to the specification shown in FIG. 4, the slave control portion 20 can determine the "identification information ID2" assigned to itself.

On the other hand, for the slave control portion 20 of the slave-incorporated connector EC1 shown in FIG. 1, the conditions of the "identification information ID1" in the specification shown in FIG. 4 are satisfied because none of the potentials of the input ports P11-P14 are fixed at the ground potential. Thus, by comparing a Hi/Lo combination of potentials of the respective input ports P11-P14 with the sets of conditions corresponding to the specification shown in FIG. 4, the slave control portion 20 can determine the "identification information ID1" assigned to itself.

For the slave control portion 20 of the slave-incorporated connector EC3 shown in FIG. 1, the conditions of the "identification information ID3" in the specification shown in FIG. 4 are satisfied because only the input port P13 is connected to the ground line 41*b* via the wire 43*c*. Thus, by comparing a Hi/Lo combination of potentials of the respective input ports P11-P14 with the sets of conditions corresponding to the specification shown in FIG. 4, the slave control portion 20 can determine the "identification information ID3" assigned to itself.

<Processing Procedure for Recognizing ID>

FIG. 5 shows a processing procedure according to which each slave control portion 20 recognizes its own ID. That is, each slave control portion 20 can recognize its own ID and cause the recognized ID to be reflected in a communication operation by its microcomputer 21's executing the process of FIG. 5. Naturally, not only each microcomputer 21 but also a common logic circuit can recognize its own ID according to the processing procedure of FIG. 5.

In the processing procedure of FIG. 5, the microcomputer 21 of each slave control portion 20 receives Hi/Lo potential states of the three input ports P12-P14 immediately after power-on of the control system (S11).

Then the microcomputer 21 stands by for a predetermined time (e.g., 3 sec) that is necessary for determination of an ID (S12). The microcomputer 21 judges whether the Hi/Lo potential states of the three input ports have varied during the standby period (S13). If a variation has occurred, the microcomputer 21 returns to step S11. If no variation has occurred, the microcomputer 21 moves to step S14, where ordinary processing is to be performed.

Before moving to the step of the ordinary processing, the microcomputer 21 determines a unique ID that is assigned to the slave control portion 20 to which it belongs by comparing the combination of the Hi/Lo potentials of the three ports that were found at step S11 with the sets of conditions corresponding to the specification of FIG. 4.

The microcomputer 21 uses the self ID thus determined in a communication operation of the ordinary processing (S14). By monitoring the potentials of the four input ports P11-P14 excluding the particular input port(s) that is fixed at the ground potential, the microcomputer 21 can detect states of the input device SE11 and the switches SW11 and SW12 and causes them to be reflected in a control.

That is, the four input ports P11-P14 are used for two kinds of purposes: they are used for determining a self ID in an initial state immediately after power-on and used for detecting states of the input device SE11 and the switches SW11 and SW12 in ordinary processing.

<Description of Modification>

FIG. 6 shows the configuration of a modification of the control system shown in FIG. 1. Elements in FIG. 6 having corresponding ones in FIG. 1 will be given the same symbols as the latter.

The control system shown in FIG. 6 is different in configuration from that shown in FIG. 1 in what the wires 43*d* and 43*c* are connected to. And the connection unit is divided into two units, that is, a connection unit EC2*a* for connecting the subharness 42(2) to the slave-incorporated connector EC2 and a connection unit EC2*b* for connecting the subharness 43(2) to the slave-incorporated connector EC2.

More specifically, in the configuration of FIG. 6, in the subharness 43(2), the wire 43*d* is connected to the adjacent wire 43*e*. Since the wire 43*e* of the subharness 43(2) is connected to the ground line 41*b* via the connection unit EC2*b*, the slave control portion 20, the connection unit EC2*a*, and the subharness 42(2), the same potential as in the configuration of FIG. 1 can be applied to the input port P14 merely by connecting the wire 43*d* of the subharness 43(2) to the adjacent wire 43*e*. With this measure, it is not necessary to connect a portion of the subharness 43(2) to the trunk line portion 41 and an ID to be assigned can be changed merely by changing the structure of the subharness 43(2).

In the configuration of FIG. 6, in the subharness 43(3), the wire 43*c* is connected to the nearby wire 43*e*. Since the wire 43*e* of the subharness 43(3) is connected to the ground line 41*b* via the slave control portion 20 and the subharness 42(3), the same potential as in the configuration of FIG. 1 can be applied to the input port P13 merely by connecting the wire 43c of the subharness 43(3) to the nearby wire 43e. With this measure, it is not necessary to connect a portion of the subharness 43(3) to the trunk line portion 41 and an ID to be assigned can be changed merely by changing the structure of the subharness 43(3).

The separation into the connection units EC2a and EC2b makes it possible to manufacture the subharness 43(2) and the subharness 43(3) as independent components of a wire harness. As a result, when, for example, the configuration of electric devices 30 which are connected to the system is changed or new electric devices 30 are added, an ID to be assigned can be changed merely by changing the configuration of a corresponding subharness 43(2); it is not necessary to change the other constituent elements.

<Advantages of Control Device and Control System>

In each of the control systems shown in FIGS. 1 and 6, the slave control units 20 incorporated in the respective slave-incorporated connectors EC1, EC2, and EC3 can be commonized in hardware and software. Thus, slave control units 20 having the same type number can be installed in the respective connectors EC1, EC2, and EC3. This makes it possible to prevent occurrence of an assembling error in manufacturing work and to reduce the manufacturing cost. Furthermore, the components cost can be reduced by the number effect. Still further, it is not necessary to do special work for assigning an ID at the time of component replacement, which makes it possible to reduce the cost of the replacement work. In addition, the number of components to be used in stock can be reduced and hence incidental costs can be lowered.

A proper ID can be assigned automatically to each slave control portion 20 merely by connecting a wire harness to it, that is, without the need for attaching a special component such as a resistor to it to assign an ID to it. Thus, even in a case of adding new electric devices to the system, simply adding a slave control portion 20 and subharnesses makes it possible to give the slave control portion 20 functions for controlling the new electric devices.

Since the input ports P11-P14 for each slave control portion 20 can be shared by the function of reading an ID assigned and the function of reading electrical signals coming from the electric devices 30, it is not necessary to increase the number of necessary ports and cost increase can be suppressed. In addition, with the processing procedure shown in FIG. 5, an ID is not fixed while the potential of each input port is varying, which makes it possible to prevent assigning of an erroneous ID.

<Possible Modifications Other than the Above>

Each of the control systems shown in FIGS. 1 and 6 is equipped with the one master control portion 10 and the plural slave control units 20. However, it is possible to construct a control system other than a master/slave one. The number of master control units 10 can be increased to two or more, and the number of slave control units 20 connected to a system can be increased or decreased as needed.

Also in each of the control systems shown in FIGS. 1 and 6, the low potential (ground potential: GND) is applied to the port(s) whose potential should be fixed among the input ports P11-P14 of the slave control portion 20 and the high-potential (Vcc) is applied to the other ports in an initial state. However, a configuration is possible in which the high potential and the low potential are applied to the respective sets of ports opposite to the above. And the specification shown in FIG. 4 can be altered when necessary.

Features of the control device and the above-described control system according to the embodiment of the invention will be summarized concisely below in the form of items [1] to [5]:

[1] A control device which is used as one of plural control units that are connected to each other via a wire harness (trunk line portion 41, subharnesses 42 and 43), the control device comprising:
  a control portion (slave control portion 20) having a plurality of input ports (P11-P14) which allow input of a binary signal respectively;
  a particular port potential determining portion (wire 43d in FIG. 1) which fixes, at a first reference potential (GND), a potential of at least one particular port an assignment state of which can be changed individually among the input ports;
  a remaining port potential determining portion (pull-up circuit 24) which sets, in an initial state, a potential of each of remaining ports that are ports other than the particular port among the input ports at a second reference potential (Vcc) that is different from the first reference potential; and
  an ID determining portion (microcomputer 21, steps S11-S14) which determines self identification information based on a combination of a potential of each of the at least one particular port and the potential of each of the remaining ports,
  wherein input elements are connected to the remaining ports respectively.

[2] The control device according to item [1], wherein the ID determining portion determines self identification information based on a combination of a potential of each of the at least one particular port and the potential of each of the remaining ports if no potential variation occurs when monitoring the potentials of the particular port and the remaining ports at least for a prescribed time at least in an initial state after power-on (steps S11-S14).

[3] The control device according to item [1], wherein the particular port potential determining portion connects a ground line or a prescribed power line to the particular port electrically; and
  wherein the remaining port potential determining portion connects the prescribed power line or the ground line to the remaining ports electrically via prescribed resistors (R11-R14), respectively.

[4] A control system comprising:
  a plurality of the control devices according to item [1] as slave control units, wherein:
  each of the slave control units (slave control portions 20) and a master control unit (master control portion 10) which controls the slave control units are connected via the wire harness (trunk line portion 41) so as to be able to communicate with each other.

[5] The control system according to item [4], wherein the control portion of each of the slave control units transmits the identification information determined by the ID determining portion to at least the master control unit (S14).

Although the invention has been described above in detail with reference to the particular embodiment, it would apparent to those skilled in the art that various changes and modifications are possible without departing from the spirit and scope of the invention.

The present application is based on Japanese Patent Application No. 2015-250166 filed on Dec. 22, 2015, the disclosure of which is incorporated herein by reference.

INDUSTRIAL APPLICABILITY

The invention provides an advantage that a control device and a control system can be provided that make it possible to commonize, in configuration and operation, plural control units included in the system and also make it possible to control various kinds of electric devices because a communication partner can be recognized using unique identification information even in a case that the plural control units are commonized in configuration and operation. Providing the above advantage, the invention is useful when applied to control devices and control systems that can be used for identifying each of plural control units in a control system having the plural control units that are connected to each other via a wire harness.

DESCRIPTION OF SYMBOLS

10: Master control portion
20: Slave control portion
21: Microcomputer
22: Power portion
23: Communication interface
24: Pull-up circuit
25: Power line
26: Ground line
27a, 27b, 27c, 27d: Signal line
28: Communication line
30: Electric devices
41: Trunk line portion
41a: Power line
41b: Ground line
41c: Communication line
42, 43: Subharness
43a, 43b, 43c, 43d, 43e: Wire
44: Connector
P11, P12, P13, P14: Input port
EC1, EC2, EC3: Slave-incorporated connector
EC2a: Connection unit
T11, T12, T13, T14, T15, T16, T17, T18: Terminal
SE11, SE21, SE31: Input device
SW11, SW12, SW21, SW22, SW23, SW31, SW32: Switch
R11, R12, R13, R14: Resistor

The invention claimed is:

1. A control device which is used as one of a plurality of control units that are connected to each other via a wire harness, the control device comprising:
a control portion having a plurality of input ports which allow input of a binary signal respectively;
a port potential determining portion which fixes, at a first reference potential, a potential of at least one particular port an assignment state of which can be changed one by one among the input ports, and the port potential determining portion further sets, in an initial state, a potential of each of remaining ports that are input ports other than the at least one particular port among the input ports at a second reference potential that is different from the first reference potential; and
an ID determining portion which determines self identification information based on a combination of a potential of each of the at least one particular port and the potential of each of the remaining ports after detection of a variation in the combination,
wherein input elements are connected to the remaining ports respectively, and
wherein the port potential determining portion is configured to change the potential of each of the remaining ports in accordance with statuses of the input elements respectively connected to the remaining ports after the initial state is elapsed.

2. The control device according to claim 1, wherein the ID determining portion determines self identification information based on a combination of a potential of each of the at least one particular port and the potential of each of the remaining ports if no potential variation occurs when monitoring the potentials of the particular port and the remaining ports at least for a prescribed time at least in an initial state after power-on.

3. The control device according to claim 1, wherein the port potential determining portion connects a ground line or a prescribed power line to the particular port electrically; and
wherein the port potential determining portion connects the prescribed power line or the ground line to the remaining ports electrically via resistors, respectively.

4. A control system comprising:
a plurality of the control devices according to claim 1 as slave control units,
wherein each of the slave control units and a master control unit which controls the slave control units are connected to each other via the wire harness so as to be able to communicate with each other.

5. The control system according to claim 4, wherein the control portion of each of the slave control units transmits the identification information determined by the ID determining portion to at least the master control unit.

6. The control device according to claim 1,
wherein, after detecting the variation in the combination, the ID determining portion is configured to set the self identification information to the variation in response to determining that the variation has been maintained for a predetermined period of time.

* * * * *